United States Patent [19]

Dayen et al.

[11] Patent Number: 4,750,595
[45] Date of Patent: Jun. 14, 1988

[54] ROTATIONAL CONTROL APPARATUS

[75] Inventors: Leonid Dayen, Plymouth; Charles D. Raines, Blaine, both of Minn.

[73] Assignee: Horton Manufacturing Co., Inc., Minneapolis, Minn.

[21] Appl. No.: 906,973

[22] Filed: Sep. 12, 1986

[51] Int. Cl.[4] .................. F16D 67/04; F16D 13/72
[52] U.S. Cl. .................. 192/18 A; 192/86; 192/110 B; 192/112; 192/113 A
[58] Field of Search .............. 192/18 A, 86, 87.17, 192/85 CA, 112, 113 A, 110 B, 48.91; 384/439, 275, 296, 297

[56] References Cited

U.S. PATENT DOCUMENTS

| | | | |
|---|---|---|---|
| 2,684,744 | 7/1954 | Myers | 192/113 A |
| 2,797,785 | 7/1957 | Earnhardt et al. | |
| 2,809,308 | 10/1957 | Turner | 192/85 CA |
| 3,020,990 | 2/1962 | Liu | |
| 3,087,587 | 4/1963 | Flieg | 192/26 |
| 3,101,010 | 8/1963 | Popovich | 74/700 |
| 3,182,776 | 5/1965 | Sommer | 192/18 A |
| 3,246,725 | 4/1966 | Brashear | 192/18 B |
| 3,378,120 | 4/1968 | Miller et al. | 192/18 A X |
| 3,623,579 | 11/1971 | Hendrickson et al. | 192/113 A X |
| 3,638,773 | 2/1972 | Lewis et al. | 192/18 A |
| 3,674,122 | 7/1972 | Buisker | 192/113 A |
| 3,730,304 | 5/1973 | Buyze | 192/113 A X |
| 3,889,784 | 6/1975 | Hanks | 192/113 A X |
| 4,049,098 | 9/1977 | Kita et al. | 192/8 R |
| 4,074,663 | 2/1978 | Cory | 192/18 A X |
| 4,078,637 | 3/1978 | Hanks | 192/91 A X |
| 4,534,454 | 8/1985 | Brooks | 192/18 A |
| 4,630,718 | 12/1986 | Hanks | 192/18 A |
| 4,633,986 | 1/1987 | Matson | 192/18 A |
| 4,633,991 | 1/1987 | Hanks et al. | 192/85 CA |
| 4,678,349 | 7/1987 | Yoshigai | 384/297 X |

FOREIGN PATENT DOCUMENTS

| | | |
|---|---|---|
| 1906950 | 9/1978 | Fed. Rep. of Germany ... 192/107 R |
| 731048 | 6/1955 | United Kingdom . |
| 1147604 | 4/1969 | United Kingdom . |
| 1203860 | 9/1970 | United Kingdom . |
| 2057599 | 4/1981 | United Kingdom ........... 192/18 A |

OTHER PUBLICATIONS

P. 8 of an Oilite ® Stock Bearing Products and Engineering Manual.

Primary Examiner—Rodney H. Bonck
Attorney, Agent, or Firm—Peterson, Wicks, Nemer & Kamrath

[57] ABSTRACT

A rotational control apparatus is shown in its most preferred form as a clutch-brake including an improved housing having a cylindrical body portion and first and second circular shaped ends removably secured thereto. The body portion includes an axially extending annular member intersecting with a radially extending annular member. The radially extending annular member forms an interface surface and a surface for reciprocal receipt of a piston inside the axially extending annular member and forms a mounting flange outside the axially extending annular member for securing axially extending studs threadably received in the second housing end. The first housing end includes an axially extending projection having surfaces for receipt in the axially extending annular member and for reciprocal receipt of the piston. The first housing end includes first and second L-shaped, oppositely directed bushings having their first legs rotatably received but axially fixed on the output shaft and having their second legs capturing an annular shoulder formed in a circular opening of the first housing end.

17 Claims, 2 Drawing Sheets

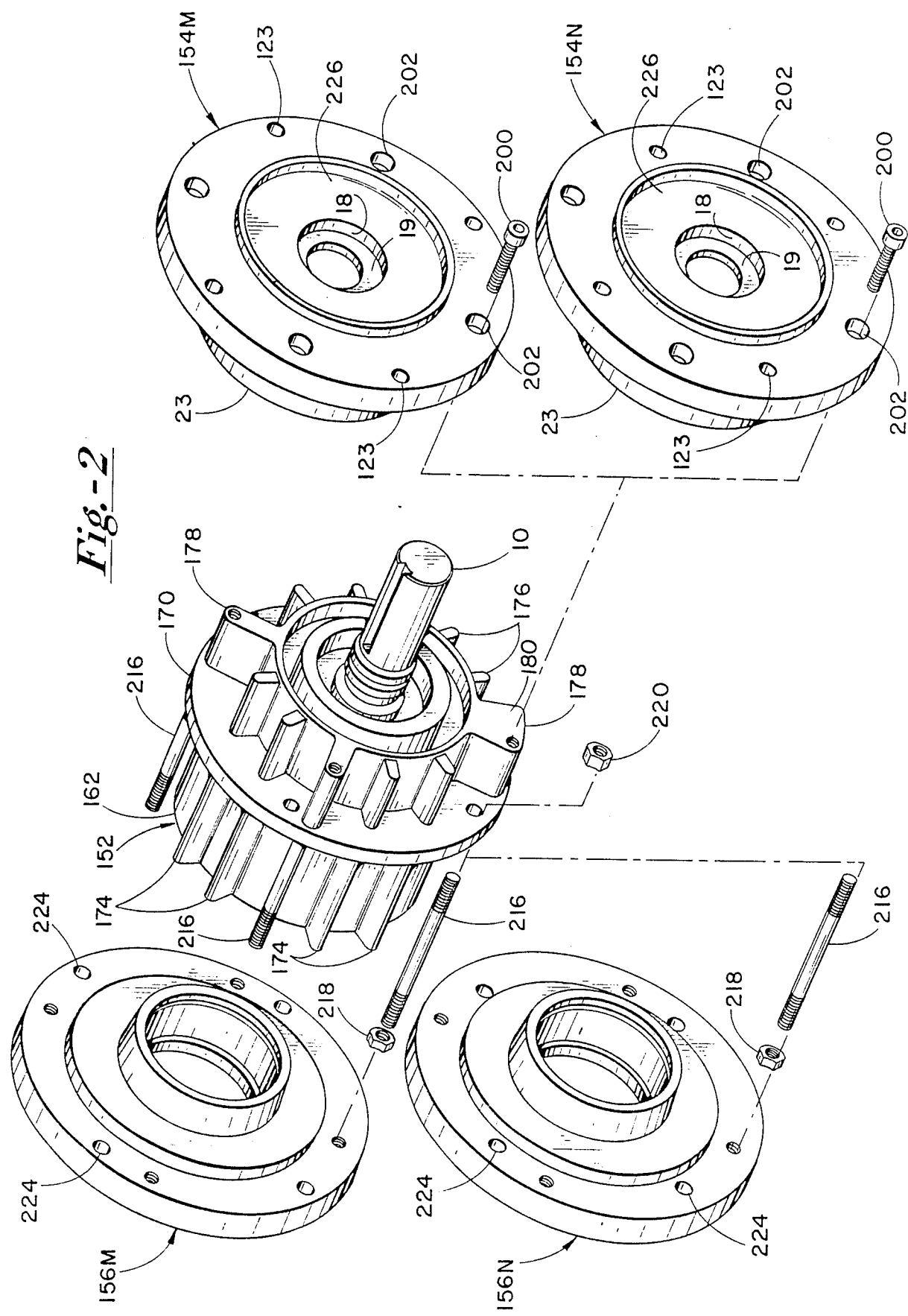

ROTATIONAL CONTROL APPARATUS

BACKGROUND

The present invention relates generally to rotational control apparatus, particularly to apparatus for controlling rotation of an output, and specifically in the preferred form to combination clutch-brakes.

It is often desired to control an output at different conditions such as by a clutch-brake. However, prior clutch-brakes suffered from deficiencies in ease of manufacture, assembly, and installation and in their ability to be utilized with differing industrial standard interconnections. Thus, a need has arisen for a clutch-brake having an improved housing utilizing modular, interchangeable, easily and inexpensively cast components which may be machined for varying industrial interconnections and which allow ease of apparatus installation.

SUMMARY

The present invention solves these and other deficiencies and problems in rotational control apparatus by providing an improved housing including a cylindrical body portion and first and second generally circular shaped ends. An axially extending projection is integrally formed on the first housing end for receipt within a free annular end of the cylindrical body portion, with the first housing end being removably secured to the cylindrical body portion. An axially extending shoulder is integrally formed on the second housing end for receipt within the other free annular end of the cylindrical body portion, with the second housing end being removably secured to the cylindrical body portion.

It is thus an object of the present invention to provide a novel apparatus for controlling rotation of an output.

It is further an object of the present invention to provide such a novel rotational control apparatus having an improved housing.

It is further an object of the present invention to provide such a novel rotational control apparatus which can be separated into two major components for installation.

It is further an object of the present invention to provide such a novel rotational control apparatus having more torque capacity.

It is further an object of the present invention to provide such a novel rotational control apparatus having faster actuation.

It is further an object of the present invention to provide such a novel rotational control apparatus utilizing modular, interchangeable components.

It is further an object of the present invention to provide such a novel rotational control apparatus utilizing common castings for varying industrial interconnections.

It is further an object of the present invention to provide such a novel rotational control apparatus utilizing components which may be easily and inexpensively cast.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows an exploded, perspective view of the improved housing of the clutch-brake of FIG. 1 illustrating the modular interchangeability thereof.

Figure 1:
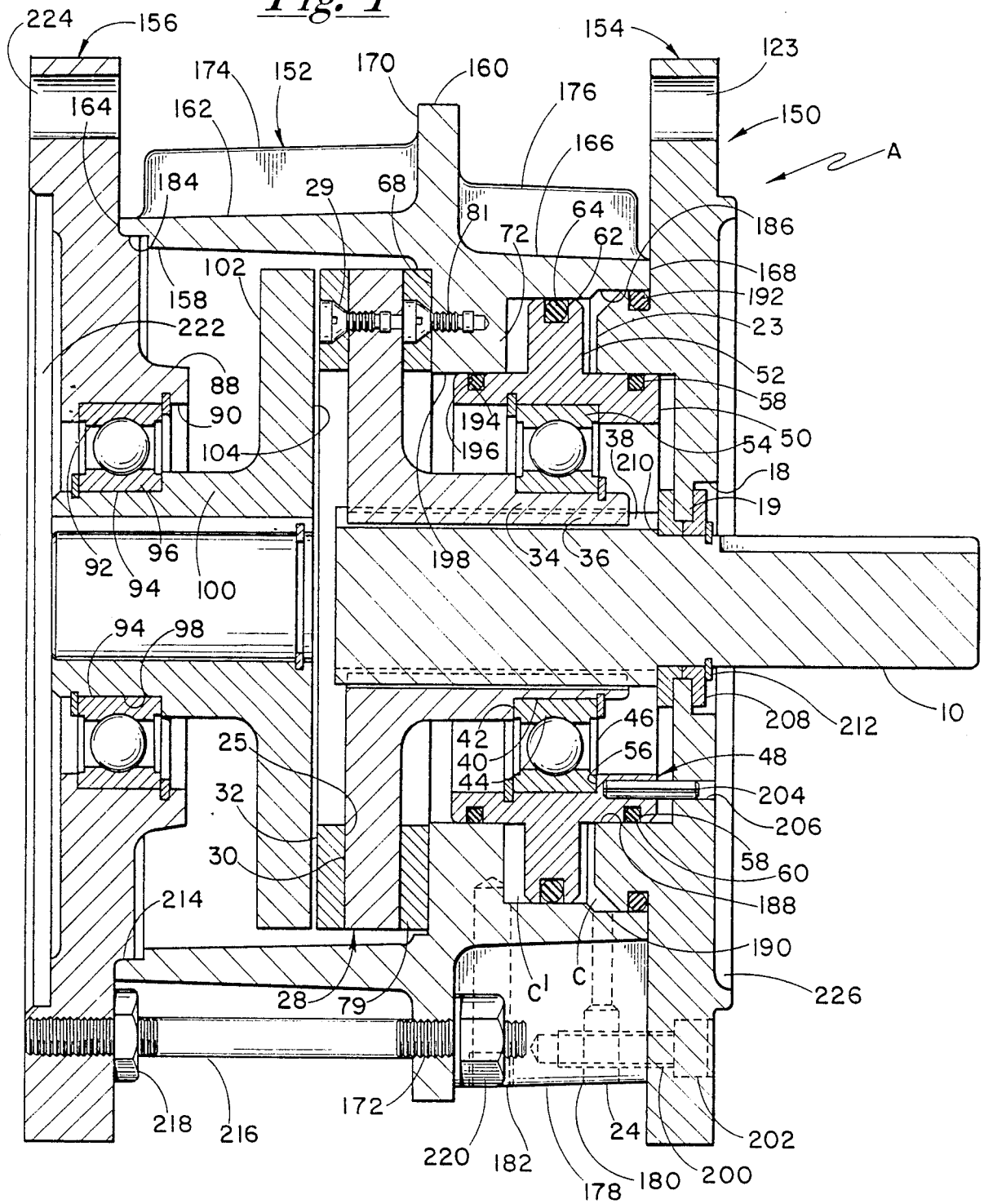
FIG. 1 shows a cross sectional view of a clutch-brake according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "inward", "outward", "first", "second", "inside", "outside", "radially", "axially", "circumferentially", and similar terms are used herein, it should be understood that these terms have reference only to the structure shown in the drawings as it would appear to a person viewing the drawings and are utilized only to facilitate describing the invention.

DESCRIPTION

An apparatus for providing rotational control of an output with an input and a housing according to the teachings of the present invention is shown in the drawings and is generally designated A. In the most preferred embodiment of the present invention, apparatus A is a clutch-brake and is an improvement of the type shown and described in U.S. Pat. No. 4,534,454. For purpose of explanation of the basic teachings of the present invention, the same numerals designate the same or similar parts in the present figures and the figures of U.S. Pat. No. 4,534,454. The description of the common numerals and the clutch-brake A may be found herein and in U.S. Pat. No. 4,534,454, which is hereby incorporated herein by reference.

Referring to the drawings in detail, the clutch-brake A includes the driven rotatable output shaft 10. Further provided is the interface disc shown in its preferred form as friction disc 28. Mounted by means of bolts 29 on the first face 30 of friction disc 28 is the first interface surface shown as friction lining ring 32. The disc 28 terminates radially inwardly in the hollow hub 34 formed with splines 36 slideably engaged with splines 38 of shaft 10. Formed on the hub 34 is the annular recess 40 forming the shoulder 42. Mounted in the recess 40 and against the shoulder 42 is the inner race 44 of bearing 46.

The numeral 48 designates an annular piston which includes the axially disposed annular flange portion 50 and extending radially outwardly therefrom is the annular portion 52. The outer race 54 of bearing 46 is mounted on the inner surface of piston flange portion 50 and against the shoulder 56 thereby rotatably mounting shaft 10 and a portion of hub 34 within piston 48.

The inner race 96 of bearing 94 is mounted in recess 98 formed on hub 100 of a first interface member shown as friction disc 102 having friction face 104. The hub 100 may be keyed to the live input shaft of a motor or other source of power.

In the preferred embodiment according to the teachings of the present invention, clutch-brake A includes a housing 150 of an improved construction including modular, interchangeable components 152, 154, and 156. Specifically, housing 150 includes a cylindrical body portion 152 including a first, generally axially extending annular member 158 which intersects with a second, generally radially extending annular member 160. Member 158 includes a first cylindrical portion 162 having a first, free annular end 164 and having a second end integrally attached to a first end of a second cylindrical portion 166 having a second, free annular end 168. In the most preferred form, the radially inward diameter of cylindrical portion 162 is generally equal to the radially outward diameter of cylindrical portion 166. In the most preferred form, annular recesses 184 and 186 are provided in the radially inward diameters of cylindrical portions 162 and 166 adjacent ends 164 and 168, respectfully, for allowing ease of assembly.

In the preferred embodiment, member 160 includes an integral, annular body portion 72 located radially inwardly of cylindrical body portion 152 and extending from the first end of second cylindrical portion 166 toward its second end 168. Cylindrical body portion 152 includes a backing portion 68 for mounting thereon the second, fixed interface member shown as friction lining ring 79 opposite second interface surface 25 of friction disc 28. Lining 79 is secured by bolts 81.

In the preferred embodiment, member 160 includes an annular, radially extending mounting flange 170 having circumferentially spaced, axially extending apertures 172. Flange 170 is generally located at the intersection of cylindrical portions 162 and 166 such that body portion 72 is slightly offset from flange 170 in the direction of end 168.

Body portion 152 further includes in its most preferred form, integral, axially extending, circumferentially spaced, heat dissipating fins 174 extending from cylindrical portion 162 from flange 170 to a point slightly axially spaced inwardly of end 164. Further, in its most preferred form, body portion 152 includes axially extending, circumferentially spaced fins 176 extending from cylindrical portion 166 from flange 170 to a point slightly axially spaced inwardly of end 168. Axially extending, circumferentially spaced mounting shoulders 178 are further provided in the preferred embodiment extending from cylindrical portion 166 from flange 170 to end 168 and circumferentially spaced from fins 176. One of the shoulders 178 in the preferred embodiment includes a port enlargement 180 including axially spaced, radially extending air ports 24 and 182.

In the preferred embodiment, housing end 154 is generally planar and circular in configuration having a diameter larger than cylindrical body portion 152. End 154 includes axially extending integral projection 23 having radially inward axially extending surface 188 and radially outward axially extending surface 190 in its most preferred form. Surface 190 has a diameter generally equal to recess 186 and for receipt therein. End 154 is removably secured to housing body 150 in its most preferred form by bolts 200 extending through circumferentially spaced, axially extending apertures 202 formed in end 154 and threadably received in mounting shoulders 178 of cylindrical body portion 152. In the most preferred form, apertures 202 include counter sunk entries for receipt of the heads of bolts 200. Suitable fluid sealing provisions 192 such as an O-ring is provided in the preferred embodiment between surface 190 of projection 23 of end 154 and cylindrical portion 166 of cylindrical body portion 152.

Annular flange portion 50 has formed on the outer surface thereof adjacent to its first end the annular groove 58 in which is positioned the O-ring 60 which makes sliding and sealing contact with surface 188 of projection 23. The second, free end of annular portion 52 of piston 48 has formed therein the groove 62 in which is positioned the O-ring 64 which makes sliding and sealing contact with the radially inward surface of cylindrical portion 166 of housing 150. Annular flange portion 50 has formed on the outer surface thereof adjacent to its second end the annular groove 194 in which is positioned the O-ring 196 which makes sliding and sealing contact with the radially inward, axially extending surface 198 of body portion 72.

It will be seen that piston 48, bearing 46, hub 34 and disc portion 28 thereof are all slidable on shaft 10. It will be further seen that the void defined by piston 48, cylindrical portion 166, and end 154 forms a cylinder C to which there is communication by air port 24. It will be further seen that the void defined by piston 48, cylindrical portion 166, and body portion 72 forms a cylinder C' to which there is communication by air port 182. For rotatably relating piston 48 to housing 150, a spring pin 204 is secured through the first end of annular flange portion 50 and is slidably received in an aperture 206 formed in end 154.

In the most preferred form, clutch-brake A includes first and second, L-shaped bushings 208 which are oppositely directed with the free ends of the first legs being contiguous and with the first legs of the first and second L-shaped bushings being received on output shaft 10. Bushings 208 are prevented from axially moving on shaft 10 by a shoulder 210 formed on shaft 10 and by a retaining ring 212 secured on shaft 10. In the most preferred form, bushings 208 are formed of Oilite Bronze. The second legs of bushings 208 capture an annular shoulder 19 formed in circular opening 18 of end 154 for axially securing bushings 208 in end 154.

In the preferred embodiment, housing end 156 is generally planar and circular in configuration having a diameter larger than cylindrical body portion 152. End 156 includes integral, axially extending shoulder 214 having a diameter generally equal to recess 184 and for receipt therein. End 156 is removably secured to housing body 150 in its most preferred form by studs 216 extending through apertures 172 and threadably received in end 156. A jam nut 218 may be provided threadably received on stud 216 and abutting with end 156. Further, a lock washer and nut 220 may be provided threadably received on stud 216 and abutting with flange 170.

Extending inwardly and axially of end 156 is the annular flange 88 which has formed on the inner surface thereof the annular recess 90 in which is mounted the outer race 92 of bearing 94. It can then be appreciated that friction discs 28 and 102 are not directly interconnected together, but are only interconnected together through their separate interconnection to housing 150 according to the teachings of the present invention.

End 156 includes provisions for mounting housing 150 and clutch-brake A to the motor or other source of power such as by a female C-face 222 and by cap screws received in circumferentially spaced, axially extending apertures 224. End 154 includes provisions for mounting housing 150 and clutch-brake A to the output apparatus such as a gear reducer such as by a male C-face 226 and by circumferentially spaced, axially extending, threaded apertures 123 for receipt of bolts extending from the gear reducer. Shaft 10 may also be keyed to a sheave, a sprocket, a coupling or the like for actuation thereof.

It will be seen that with no air pressure in cylinder C and upon introducing fluid pressure into cylinder C' by a source (not shown) connected to port 182, piston annular portion 52 moves whereby interface surface 25 of disc 28 is made to contact lining 79 and through hub 34 brake shaft 10. With no air pressure in cylinder C' and upon introducing fluid pressure into cylinder C by a source (not shown) connected to inlet 24, piston annular portion 52 moves whereby interface surface 25 is separated from lining 79 and as a result there is no braking of shaft 10, and friction lining 32 contacts face 104 of live friction disc 102 whereby shaft 10 is clutched in.

Now that the basic construction and operation of a preferred embodiment according to the teachings of the present invention have been set forth, subtle features and advantages of the present invention can be set forth and appreciated. A first difference between clutch-brake A disclosed herein and clutch-brake A disclosed in U.S. Pat. No. 4,534,454 is that no springs are utilized in the present construction in moving piston 48 whereas springs are utilized for moving the piston in the construction described in U.S. Pat. No. 4,534,454. Separate fluid cylinders C and C' as in the present invention allow more torque capacity in the engagement of the clutch or brake in clutch-brake A. Further, faster actuation of the clutch in clutch-brake A of the present invention is possible because it is not necessary to compress springs as in U.S. Pat. No. 4,534,454. However, it should also be appreciated that clutch-brake A of the present invention obtains many of the advantages gained by clutch-brake A of the U.S. Pat. No. 4,534,454 including prevention of simultaneous clutching and braking of output shaft 10.

A further major difference between clutch-brake A of the present invention and U.S. Pat. No. 4,534,454 is the housing construction. It should then be noted that housing 150 according to the teachings of the present invention is of a modular, interchangeable component type. Specifically, housing ends 154 and 156 of different types and constructions may be utilized and interchanged with a common body portion 152. For example, as shown in FIG. 2, housing ends 154M and 156M may be utilized with a body portion 152 for interconnection between a power source and output apparatus utilizing metric standard interconnections. Similarly, housing ends 154N and 156N may be utilized with the same body portion 152 for interconnection between a power source and output apparatus utilizing NEMA (inch) standard interconnections. It can then further be appreciated that it is even possible to mismatch housing ends 154 and 156 between metric and NEMA standards.

Furthermore, it should be appreciated that since body portion 152 is identical for either metric or NEMA type interconnections, it is then only necessary to manufacture and keep on inventory a single type of body portion 152 rather than separate housing constructions for each type of industry interconnections such as metric or NEMA standards.

Similarly, according to the teachings of the present invention, the remaining components are of identical constructions such as piston 48, bearings 46 and 94, friction linings 79 and 104 and the like or may be machined from a common casting to either a metric, NEMA, or other industry standard such as hub 34 or shaft 10 and hub 100, and housing ends 154 and 156. Therefore, machining from a common casting greatly reduces the number of casting molds and the capital expenditures required to manufacture clutch-brake A for interconnection with other components of varying industrial standards according to the teachings of the present invention. Further, it is then only necessary to manufacture and keep in inventory a significantly reduced number of components while having clutch-brakes A which fit both metric and NEMA industry standards.

It should then be further noted that the preferred construction of cylindrical body portion 152 according to the teachings of the present invention is further advantageous. First, body portion 152 is adaptable for easy casting, with mounting flange 170 lying between the mold interface and dividing the draft angles of cylindrical body portion 152. Further, the provision of fins 174 and 176 allows for the dissipation of heat from clutch-brake A according to the teachings of the present invention without requiring cooling air apertures requiring window cores during casting. Furthermore, fins 174 and 176 structurally reinforce mounting flange 170.

Additionally, housing 150 and clutch-brake A according to the teachings of the present invention are particularly advantageous when it is necessary to disassemble clutch-brake A for installation, such as when the C-face is larger than the bore circle of apertures 224. Specifically, clutch-brake A according to the teachings of the present invention can be separated into two major components, a first component including housing end 156 and friction disc 102 and a second component including body portion 152, housing end 154, friction disc 28, and piston 48 held together by the interconnection of body portion 152 and housing end 154 by bolts 200. Housing end 156 may then be interconnected to the power source by bolts extending through apertures 224 and body portion 152 may be interconnected to housing end 156 by studs 216, with housing end 154 being interconnected to the output apparatus utilizing bolts received in apertures 123 either before or after the interconnection of body portion 152 to housing end 156.

Further, the use of bushings 208 in housing end 154 according to the teachings of the present invention is particularly advantageous over utilization of ball bearings. Specifically, bushings 208 are clearly less expensive than ball bearings. Further, the fabrication of end 154 and its assembly with bushings 208 and output shaft 10 according to the teachings of the present invention is easier and less expensive. Furthermore, the axial length required for bushings 208 is considerably shorter than for ball bearings allowing clutch-brake A according to the teachings of the present invention to be axially shorter and friction disc 28 to be axially closer to the output apparatus than when roller bearings are utilized. Thus, although roller bearings are more capable of receiving overhang and radial loads, the construction of clutch-brake A according to the teachings of the present invention and the direct interconnection of housing end 154 to the output apparatus allows use of bushings 208 which reduces the overall cost of clutch-brake 10.

Now that the basic teachings of the present invention have been explained, many extensions and variations will be obvious to one having ordinary skill in the art. For example, although housing 150 in the preferred form of the present invention does not include cooling air apertures and is believed to be advantageous, such cooling air apertures or other cooling provisions may be provided in addition to and/or instead of fins 174 and 176.

Further, although securement of housing ends 154 and 156 to body portion 152 is shown in the preferred embodiment including bolts 200 and studs 216 and associated structure, other forms of securement may be apparent to one skilled in the art after the teachings of the present invention are known.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In an apparatus for providing rotational control of an output including an interface disc having first and second interface surfaces, a housing, a piston interconnected for axial movement with the interface disc and for rotation relative to the interface disc, a first interface member formed on an input for interfacing with the first interface surface of the interface disc, a second interface member formed on the housing for interfacing with the second interface surface of the interface disc, with the improvement comprising an improved housing comprising, in combination: a cylindrical body portion; a first generally circular shaped housing end; a second generally circular shaped housing end; with the cylindrical body portion including a first, axially extending annular member which intersects with a second, radially extending annular member, with the first, axially extending annular member having a first, free annular end and a second, free annular end, with the first, free annular end having a diameter and the second, free annular end having a diameter, with the second, radially extending annular member including an annular body portion integral with and extending radially inwardly of the first, axially extending annular member, with the annular body portion including the second interface member; with the second, radially extending annular member including a flange extending radially outwardly of the axially extending annular member; circumferentially spaced heat dissipating fins integrally formed with and extending outwardly and axially from the axially extending annular member and integrally formed with and on both sides of the radially extending flange; axially extending mounting shoulders integrally formed with and extending axially from the axially extending annular member and the radially extending flange; an axially extending projection integrally formed on the first housing end having a radially outward axially extending surface with a diameter generally equal to and for receipt within the second, free annular end of the axially extending annular member; bolts extending axially through the first housing end and threadably received in the axially extending mounting shoulders for removably securing the first housing end to the second, free annular end of the axially extending annular member; an axially extending shoulder integrally formed on the second housing end having a diameter generally equal to and for receipt within the first, free annular end of the axially extending annular member; and axially extending studs having a first end threadably received in the second housing end and having a second end secured to the radially extending flange for removably securing the second housing end to the first, free annular end of the axially extending annular member.

2. The apparatus of claim 1 further comprising, in combination: first and second L-shaped bushings having first and second legs, with the first legs having free ends, with the first and second L-shaped bushings being oppositely directed with the free ends of the first legs being contiguous, with the first legs of the first and second L-shaped bushings being rotatably received on the output; an annular shoulder formed in a circular opening of the first housing end, with the annular shoulder being captured between the second legs of the first and second L-shaped bushings; and means for preventing axial movement of the first legs of the first and second L-shaped bushings on the output.

3. The apparatus of claim 1 wherein the radially extending flange is axially offset from the second interface member in the direction of the second housing end; and wherein the radially extending flange divides the first, axially extending annular member into a first cylindrical portion and a second cylindrical portion, with the first and second cylindrical portions having different casting draft angles.

4. The apparatus of claim 1 wherein the output and the first interface member are rotatably mounted with respect to the housing and independent of each other allowing the apparatus to be readily disassembled into first and second major components for apparatus installation, with the first major component including the first interface member and the second housing end and with the second major component including the output, the cylindrical body portion, and the first housing end.

5. In an apparatus for providing rotational control of an output including an interface disc having a first and second interface surfaces, a housing, a first interface member formed on an input for interfacing with the first interface surface of the interface disc, a second interface member formed on the housing for interfacing with the second interface surface of the interface disc, a piston, and means for interconnecting the piston for axial movement with the interface disc and for rotation relative to the interface disc, with the housing comprising, in combination: a cylindrical body portion; a first housing end having a generally circular shape; a second housing end; with the cylindrical body portion including an axially extending annular member having a free annular end, with the free annular end having a diameter, with the second interface member being integral with and exending radially inwardly of the axially extending annular member; a mounting flange extending radially outwardly of the axially extending annular member slightly offset from the second interface member; an axially extending projection integrally formed on the first housing end having a radially outward axially extending surface with a diameter generally equal to and for receipt within the free annular end of the axially extending annular member; means for removably securing the first housing end to the free annular end of the axially extending annular member; and means accessible outside of the axially extending annular member of the cylindrical body portion for removably securing the second housing end to the mounting flange of the cylindrical body portion; with the improvement comprising means for reciprocally mounting the piston within the housing comprising, in combination: a radially inward axially extending surface formed on the axially extending projection of the first housing end; an axially extending surface formed on the second interface member of the cylindrical body portion; with the piston comprising, in combination: an axially disposed annular flange portion; with the piston abutting with and for reciprocal movement within the axially extending annular memer, with the piston being slideable on the radially inward axially extending surface formed on the axially extending projection of the first housing end, and with the axially disposed annular flange portion of the piston being slideable on the axially extending surface formed on the second interface member of the cylindrical body portion.

6. The apparatus of claim 5 further comprising, in combiantion: means for sealing between the radially outward axially extending surface formed on the axially extending projection of the first housing end and the free annular end of the axially extending annular member; means for sealing between the piston and the axially extending annular member; means for sealing between the piston and the radially inward axially extending surface formed on the axially extending projection of the first housing end; means for sealing between the axially disposed annular flange of the piston and the axially extending surface formed on the second interface member of the cylindrical body portion, with a first pressure cylinder defined by the piston, the axially extending projection of the first housing end, and the axially extending annular member, with a second pressure cylinder defined by the piston, the second interface member, and the axially extending annular member; means for introducing fluid pressure into the first pressure cylinder; and means for introducing fluid pressure into the second pressure cylinder.

7. The apparatus of claim 5 wherein the radially extending mounting flange is axially offset from the second interface member in the direction of the second housing end.

8. The apparatus of claim 5 wherein the housing is stationary and the apparatus acts as a brake of the output when the interface disc interfaces with the second interface member of the housing.

9. The apparatus of claim 5 wherein the means for removably securing the first housing end to the axially extending annular member comprises, in combination: bolts extending axially through the first housing end and threadably received in the cylindrical body portion.

10. The apparatus of claim 9 further comprising, in combination: axially extending mounting shoulders integrally formed with and extending axially from the axially extending annular member, with the bolts being threadably received in the mounting shoulders.

11. The apparatus of claim 6 wherein the means for removably securing the second housing end to the mounting flange comprises, in combination: axially extending studs having a first end threadably received in the second housing end and having a second end secured to the mounting flange of the cylindrical body portion.

12. In an apparatus for providing rotational control of an output including an interface disc having first and second interface surfaces, a housing, a first interface member formed on an input for interfacing with the first interface surface of the interface disc, a second interface member formed on the housing for interfacing with the second interface surface of the interface disc, with the improvement comprising an improved housing comprising, in combination: a cylindrical body portion; a first housing end having a generally circular shape; a second housing end; with the cylindrical body portion including an axially extending annular member having a free annular end, with the second interface member being integral with and extending radially inwardly of the axially extending annular member; a mounting flange extending radially outwardly of the axially extending annular member slightly offset from the second interface member; means for removably securing the first housing end to the free annular end of the axially extending annular member; means accessible outside of the axially extending annular member of the cylindrical body portion for removably securing the second housing end to the mounting flange of the cylindrical body portion; first and second L-shaped bushings having first and second legs, with the first legs having free ends, with the first and second L-shaped bushings being oppositely directed with the free ends of the first legs being contiguous, with the first legs of the first and second L-shaped bushings being rotatably received on the output; an annular shoulder formed in a circular opening of the first housing end, with the annular shoulder being captured between the second legs of the first and second L-shaped bushings; and means for preventing axial movement of the first legs of the first and second L-shaped bushings on the output.

13. In an apparatus for providing rotational control of an output including an interface disc having first and second interface surfaces, a housing, a first interface member formed on an an input for interfacing with the first interface surface of the interface disc, a second interface member formed on the housing for interfacing with the second interface surface of the interface disc, with the improvement comprising an improved housing comprising, in combination: a cylindrical body portion; a first housing end having a generally circular shape; a second housing end; with the cylindrical body portion including an axially extending annular member having a free annular end, with the second interface member being integral with and extending radially inwardly of the axially extending annular member; a mounting flange extending radially outwardly of the axially extending annular member slightly offset from the second interface member; means for removably securing the first housing end to the free annular end of the axially extending annular member; and means accessible outside of the axially extending annular member of the cylindrical body portion for removably securing the second housing end to the mounting flange of the cylindrical body portion; wherein the output and the first interface member are rotatably mounted with respect to the housing and independent of each other allowing the apparatus to be readily disassembled into first and second major components for apparatus installation, with the first major component including the first interface member and the second housing end and with the second major component including the output, the cylindrical body portion, and the first housing end.

14. The apparatus of claim 13 further comprising, in combination: circumferentially spaced heat dissipating fins integrally formed with and extending axially from the axially extending annular member and integrally formed with and extending axially from the radially extending mounting flange.

15. The apparatus of claim 14 wherein the means for removably securing the second housing end to the mounting flange comprises, in combination: axially extending studs having a first end threadably received in the second housing end and having a second end secured to the radially extending mounting flange.

16. The apparatus of claim 13 wherein the means for removably securing the first housing end to the axially extending annular member comprises, in combination: bolts extending axially through the first housing end and threadably received in the cylindrical body portion.

17. The apparatus of claim 16 further comprising, in combination: axially extending mounting shoulders integrally formed with and extending axially from the axially extending annular member and the radially extending mounting flange, with the bolts being threadably received in the mounting shoulders.

* * * * *

UNITED STATES PATENT OFFICE
CERTIFICATE OF CORRECTION

Patent No. 4,750,595     Dated June 14, 1988

Inventor(s) Leonid Dayen and Charles D. Raines

It is certified that error appears in the above-identified patent and that said Letters Patent are hereby corrected as shown below:

Column 8, line 43, cancel "a".

Column 9, line 22, cancel "combiantion" and substitute therefor --combination--.

Column 9, line 60, cancel "6" and substitute therefor --5--.

Column 10, line 37, cancel "an" (second occurrence).

Signed and Sealed this

Twenty-seventh Day of September, 1988

Attest:

DONALD J. QUIGG

Attesting Officer     Commissioner of Patents and Trademarks